Feb. 25, 1958 J. R. BROOKS 2,824,405
GRAVITY OPERATED COLLAPSIBLE TRAP
Filed Jan. 28, 1957 3 Sheets-Sheet 1
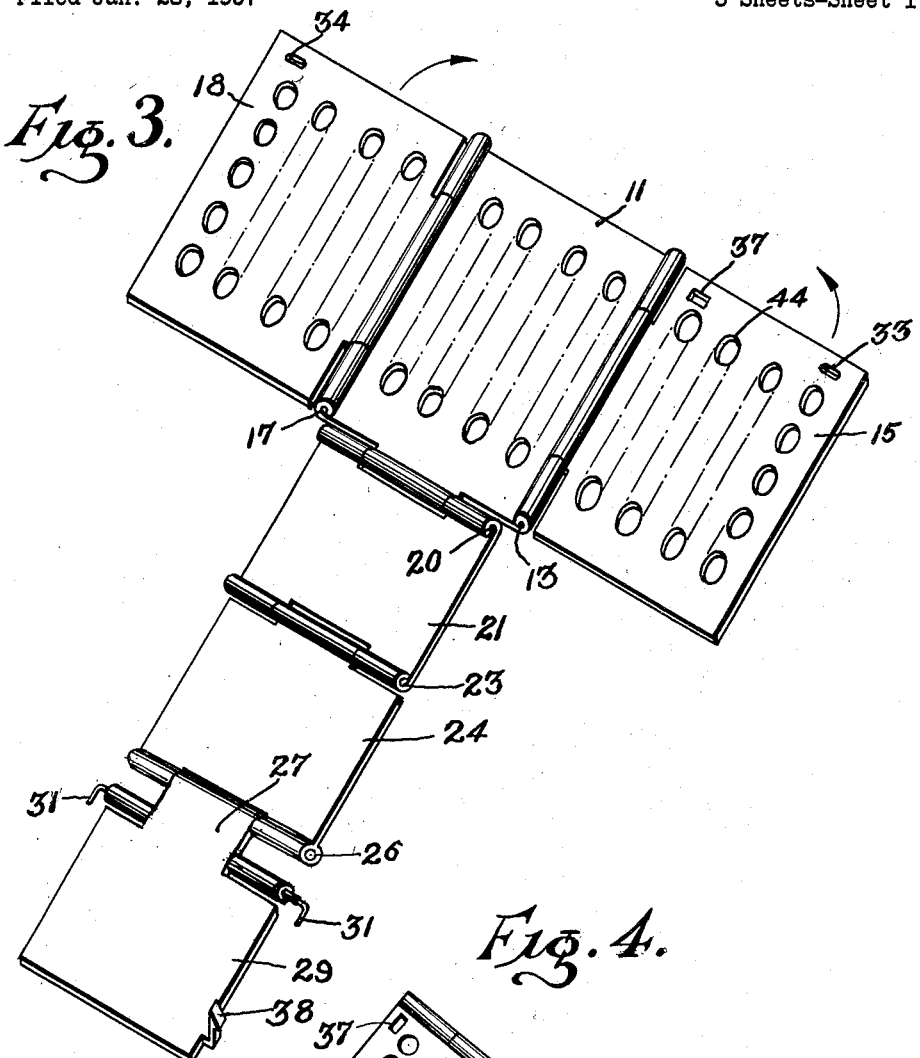
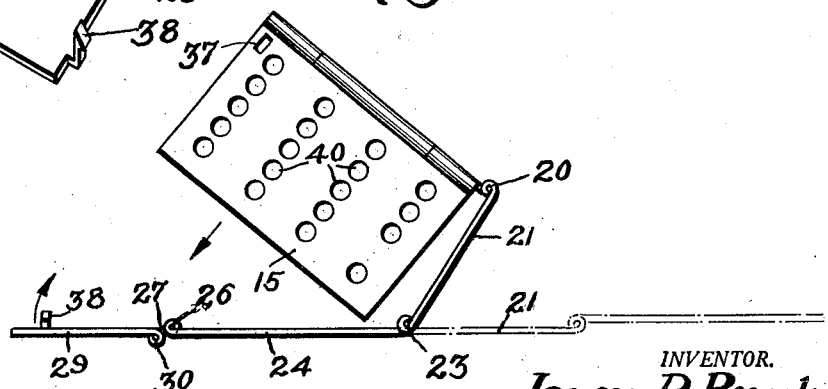
INVENTOR.
*Jerry R. Brooks*

Feb. 25, 1958     J. R. BROOKS     2,824,405
GRAVITY OPERATED COLLAPSIBLE TRAP
Filed Jan. 28, 1957     3 Sheets-Sheet 2
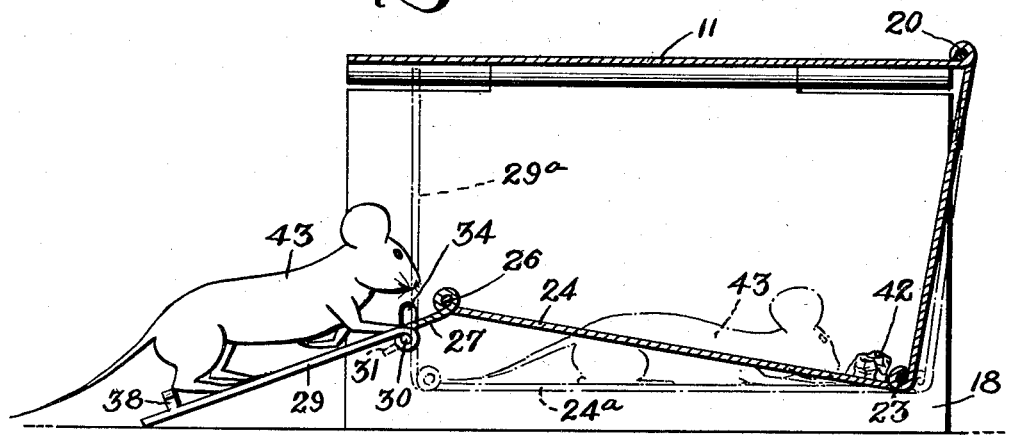
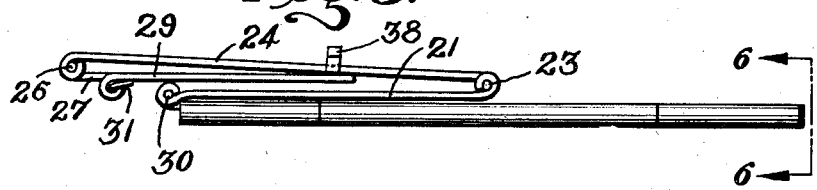
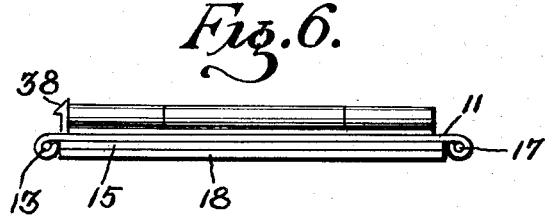
INVENTOR.
*Jerry R. Brooks*

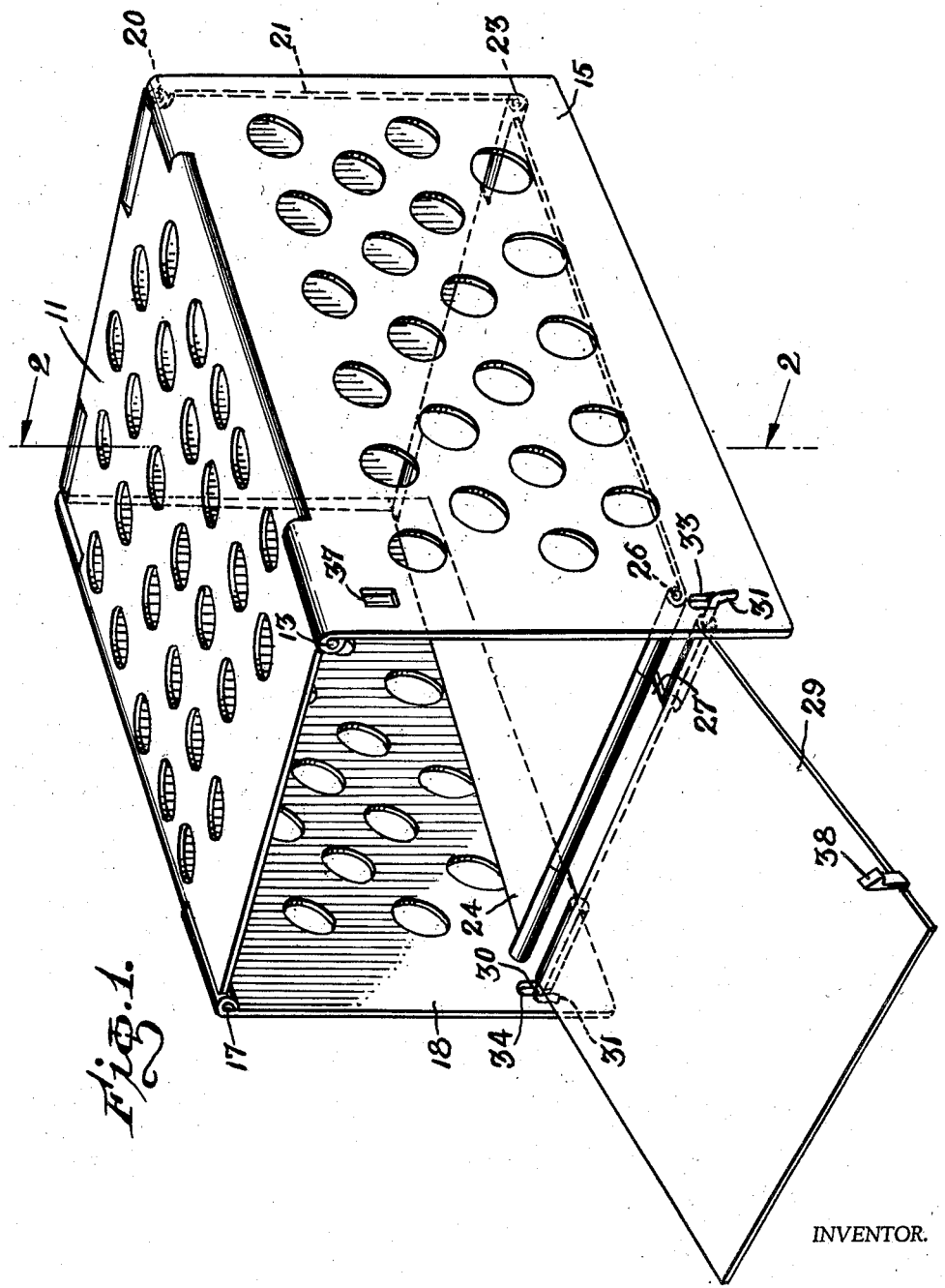

United States Patent Office 2,824,405
Patented Feb. 25, 1958

2,824,405

GRAVITY OPERATED COLLAPSIBLE TRAP

Jerry R. Brooks, Gainesville, Tex.

Application January 28, 1957, Serial No. 636,609

6 Claims. (Cl. 43—61)

This invention relates to animal traps and more particularly to gravity operated animal traps that are collapsible when not in use.

It is an object of the present invention to provide a collapsible trap for animals that includes means operated by gravity for automatically securing the trap in a closed position after an animal enters the trap.

Another object of the present invention is to provide a gravity operated collapsible animal trap that is of light weight construction, readily moved between an erected and collapsed position, and which provides sufficient ventilation means for preventing loss of air to the animal trapped therein.

It is an object of the present invention to provide a gravity operated collapsible trap of the above type wherein a plurality of substantially flat rectangular panels are hingedly connected in a predetermined manner to facilitate the erection and collapse of the trap and which hinged connections also include self contained lever means for automatically operating the gate of the trap in response to the entry of an animal therein.

Other objects of the invention are to provide a collapsible trap bearing the above objects in mind which is of simple construction, has a minimum number of parts, is inexpensive to manufacture and efficient in operation.

For other objects and for a better understanding of the invention, reference may be had to the following detailed description taken in connection with the accompanying drawing, in which:

Figure 1 is a perspective view of a collapsible animal trap made in accordance with the present invention, shown in an erected position with the gate thereof in an open position;

Figure 2 is a long cross-sectional view taken along line 2—2 of Figure 1;

Figure 3 is a perspective view of the hinged panels of the trap shown in a collapsed flat position;

Figure 4 is a side elevational view of the trap shown in Figure 1, in a partially collapsed position;

Figure 5 is a side elevational view of the panels shown in Figure 3 in a completely folded, collapsed position; and Figure 6 is an end elevational view taken along line 6—6 of Figure 5.

Referring now more in detail to the drawing, more particularly to Figures 1 and 3 thereof, a gravity operated collapsible animal trap made in accordance with the present invention is shown to include a plurality of substantially flat rectangular panels that are hingedly connected together in a predetermined manner. The top or main panel 11 is hingedly connected at one side, by means of a hinge pin 13, to a first side wall 15. A similar hinge pin 17 hingedly connects the side of the main panel 11 to an opposite side wall 18. The rear end of the main panel 11 is hingedly connected, by means of a hinge pin 20, to one end of a rear wall 21.

The opposite end of the rear wall 21 is hingedly connected to the rear extremity of a floor panel 24 by means of a similar hinge pin 23. The forward end of the floor 24 is connected, by means of a hinge pin 26 to an outwardly projecting tab 27 of the gate or door 29. A fulcrum pin 30 is rotatably secured to an intermediate portion of the gate 29 and has a pair of angularly related side lugs 31 that are removably received within elongated openings 33, 34, adjacent to the bottom edges of each of the side panels 15, 18, respectively. As is more clearly shown in Figures 1 and 2, the hinge and fulcrum pins are so arranged that an animal 43 may be supported upon the open gate 29 as it approaches the bait 42 that may be placed at the inside corner of the trap. However, the weight of the animal upon the floor 24 is operative to effect a downward movement of the hinge pin 26 and the resulting rotational movement of the gate 29 about the fulcrum pin 30. Thus, the movement of the floor 24 under the weight of the animal to a depressed position 24a is automatically operative to swing the gate 29 to a vertical or completely closed position 29a.

The upper corner of one of the side panels 15 is provided with a latch opening 37 that is adapted to removably engage with a spring hook 38 secured to a side edge of the gate 29. This hook is adapted to secure the gate in the closed position after the weight of the animal has swung it to the vertical position 29a, so that escape of the animal is impossible. However, the trap may be opened merely by exerting a sufficient outward pressure against the side of the side panel 15 to effect the disengagement of the latch parts. While the gate, floor panel, and rear wall panel are of imperforate construction, each of the top and side panels are provided with a plurality of large holes or openings 40 which permit sufficient air to circulate within the trap to sustain the life of the animal. Also, these holes decrease the weight of the trap, thereby reducing the cost of manufacture and increasing its portability.

In order to collapse the trap from an assembled position shown in Figures 1 and 2, to the completely collapsed positions shown in Figures 5 and 6, the lugs 31 of the fulcrum pin 30 are first released from their engagement with the openings 33, 34, in the side panels. The gate 29 is then swung beneath the floor panel 24 and these two elements are then swung beneath the rear panel 21. Then, the three elements are swung about the hinge pin 20 to the top side of the top panel 11. The side panels 15, 18, are then swung inwardly beneath the lower surface of the top panel 11, whereby the parts assume the position shown in Figures 5 and 6. In order to assemble the trap, the aforementioned procedure is reversed, in the manner shown in Figure 4.

While various changes may be made in the detail construction, it shall be understood that such chanegs shall be within the spirit and scope of the present invention as defined by the appended claims.

What I claim as new and desire to protect by Letters Patent of the United States is:

1. A gravity operated animal trap formed of a plurality of hingedly connected substantially rectangular flat panels adapted to be folded upon each other to collapse said trap for storage purposes, said panels in normally assembled relation comprising a main top panel, a side panel hingedly connected to each side of said top panel, a rear wall panel hingedly connected at one end to an end of said top panel and free to swing inwardly of said trap, a bodily movable floor panel pivotally connected at one end to the opposite end of said rear wall panel, a gate hingedly connected at one end to the opposite end of said floor panel, the opposite end of said gate having latch means adapted to cooperate with one of said side panels to secure said gate in a closed position when rotated from a normally open position, and gravity operated means including said floor panel for automatically effecting said rotation of said gate from said normally open to a closed position.

2. The combination according to claim 1, wherein said gravity operated means also comprises a fulcrum pin rotatably secured intermediate said one end and said opposite end of said gate, and said fulcrum pin is removably engaged at opposite ends with each one of said side panels, whereby downward movement of said floor panel is adapted to effect downward movement of said one end of said gate to effect rotation of said gate about said fulcrum pin toward said closed position.

3. The combination according to claim 2, wherein said fulcrum pin has an angularly related lug at each extremity, and each of said side panels is provided with a key way spaced from each of said hinged connections to said top panel adapted to removably receive one of said fulcrum pin lugs.

4. The combination according to claim 3, wherein said fulcrum pin is spaced closer to said one end of said gate than to said opposite end thereof.

5. The combination according to claim 4, wherein said gate comprises releasable spring arcuated latch means adapted to cooperate with one of said side panels to removably secure said gate in said closed position.

6. The combination according to claim 5, wherein said top and side panels are perforated to provide maximum air circulation and minimum weight.

References Cited in the file of this patent

UNITED STATES PATENTS

| 283,171 | Walker | Aug. 14, 1883 |
| 644,697 | Uzzelle | Mar. 6, 1900 |
| 884,380 | Hadley | Apr. 14, 1908 |

FOREIGN PATENTS

| 12,921 | Great Britain | Aug. 18, 1890 |